(12) United States Patent
Taki et al.

(10) Patent No.: US 8,908,324 B1
(45) Date of Patent: Dec. 9, 2014

(54) SPINDLE MOTOR FOR USE IN DISK DRIVE APPARATUS, DISK DRIVE APPARATUS, AND METHOD OF MANUFACTURING STATOR

(71) Applicant: Nidec Corporation, Kyoto (JP)

(72) Inventors: Masanobu Taki, Kyoto (JP); Hiroshi Kobayashi, Kyoto (JP); Tomohiro Yoneda, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/250,739

(22) Filed: Apr. 11, 2014

(51) Int. Cl.
*G11B 5/127* (2006.01)
*G11B 19/20* (2006.01)
*H02K 3/38* (2006.01)
*H02K 15/02* (2006.01)

(52) U.S. Cl.
CPC .............. *G11B 19/2009* (2013.01); *H02K 3/38* (2013.01); *H02K 15/02* (2013.01)
USPC ...................................... 360/99.08

(58) Field of Classification Search
CPC .... G11B 19/20; G11B 19/2009; G11B 17/02; G11B 17/028; G11B 17/0284; G11B 33/14; G11B 33/1472
USPC ....................... 360/99.08, 99.12, 99.06, 99.16
See application file for complete search history.

(56) References Cited

U.S. PATENT DOCUMENTS

| 5,572,381 A | 11/1996 | Stewart |
| 6,118,198 A | 9/2000 | Hollenbeck et al. |
| 6,652,324 B2 | 11/2003 | Maiers et al. |
| 6,771,460 B2 | 8/2004 | Nii et al. |
| 7,012,191 B1 | 3/2006 | Watanabe et al. |
| 7,105,963 B2 | 9/2006 | Ito et al. |
| 7,144,275 B2 | 12/2006 | Iida |
| 7,254,882 B2 | 8/2007 | Ito et al. |

(Continued)

FOREIGN PATENT DOCUMENTS

| JP | 07-75275 A | 3/1995 |
| JP | 07-107693 A | 4/1995 |

(Continued)

OTHER PUBLICATIONS

Taki et al.; "Spindle Motor for Use in Disk Drive Apparatus and Disk Drive Apparatus"; U.S. Appl. No. 14/265,508, filed Apr. 30, 2014.

(Continued)

*Primary Examiner* — Allen T Cao
(74) *Attorney, Agent, or Firm* — Keating & Bennett, LLP

(57) ABSTRACT

A motor includes a base portion including a plurality of base through holes passing there through and a stator arranged on an upper side of the base portion. A plurality of coils of the stator include three coil groups including one or more of the coils defined by a single conducting wire. A joint portion where at least two of three common wires are joined together to define a single common wire is provided on the upper side of the base portion. Each common wire is one end portion of the conducting wire defining a separate one of the three coil groups. Each of the common wire elements and lead wire elements passes through a separate one of the base through holes. Each base through hole includes a circular sealing portion between an inner circumference and an entire circumferential extent of a corresponding one of the wire elements.

15 Claims, 11 Drawing Sheets

(56) References Cited

U.S. PATENT DOCUMENTS

| | | |
|---|---|---|
| 7,684,146 B1 | 3/2010 | Andrikowich et al. |
| 7,757,378 B1 | 7/2010 | Mann et al. |
| 8,120,217 B2 | 2/2012 | Yawata et al. |
| 8,120,872 B2 | 2/2012 | Sekii et al. |
| 8,164,851 B2 | 4/2012 | Yoneda et al. |
| 8,299,668 B2 | 10/2012 | Yawata et al. |
| 8,304,945 B2 | 11/2012 | Yawata et al. |
| 8,324,771 B2 | 12/2012 | Yawata et al. |
| 8,400,729 B1 | 3/2013 | Watanabe |
| 8,607,257 B2 * | 12/2013 | Kim .............................. 720/695 |
| 8,675,305 B2 | 3/2014 | Watanabe et al. |
| 8,687,316 B2 | 4/2014 | Watanabe et al. |
| 2005/0206255 A1 | 9/2005 | Yoshino et al. |
| 2006/0023339 A1 | 2/2006 | Fukuyama et al. |
| 2007/0253102 A1 * | 11/2007 | Abdul Hameed .......... 360/99.08 |
| 2009/0316299 A1 | 12/2009 | Tashiro et al. |
| 2011/0249362 A1 | 10/2011 | Saichi et al. |
| 2012/0092792 A1 | 4/2012 | Sugi et al. |
| 2012/0110606 A1 * | 5/2012 | Kim .............................. 720/695 |
| 2012/0113546 A1 | 5/2012 | Sugi et al. |
| 2012/0162818 A1 | 6/2012 | Sugi et al. |
| 2012/0200957 A1 | 8/2012 | Yawata |
| 2013/0031773 A1 | 2/2013 | Matsuyama et al. |
| 2013/0050874 A1 | 2/2013 | Yawata et al. |
| 2014/0068643 A1 * | 3/2014 | Kim .............................. 720/704 |

FOREIGN PATENT DOCUMENTS

| | | |
|---|---|---|
| JP | 07-222386 A | 8/1995 |
| JP | 07-334967 A | 12/1995 |
| JP | 11-218128 A | 8/1999 |
| JP | 2000-209804 A | 7/2000 |
| JP | 2001-067775 A | 3/2001 |
| JP | 2005-057892 A | 3/2005 |
| JP | 2006-040423 A | 2/2006 |
| JP | 2009-110611 A | 5/2009 |
| JP | 2012-74114 A | 4/2012 |

OTHER PUBLICATIONS

Matsuyama et al.; "Spindle Motor, Disk Drive Apparatus, and Method of Manufacturing Spindle Motor"; U.S. Appl. No. 13/424,63, filed Mar. 20, 2012.

* cited by examiner

US 8,908,324 B1

SPINDLE MOTOR FOR USE IN DISK DRIVE APPARATUS, DISK DRIVE APPARATUS, AND METHOD OF MANUFACTURING STATOR

BACKGROUND OF THE INVENTION

1. Field of the Invention

The present invention relates to a spindle motor for use in a disk drive apparatus, the disk drive apparatus, and a method of manufacturing a stator.

2. Description of the Related Art

Disk drive apparatuses, such as hard disk drives, typically have spindle motors (hereinafter referred to simply as "motors") installed therein. In a disk drive apparatus disclosed in JP-A 2012-74114, a base portion extending radially around a central axis includes a plurality of through holes. A U-phase common wire, a V-phase common wire, and a W-phase common wire are drawn out from a U-phase coil, a V-phase coil, and a W-phase coil, respectively, of a motor. The common wire of each phase is individually passed through a separate one of the through holes to reach a lower side of the base portion, and is electrically connected to a circuit board. Each through hole is sealed with a sealant, whereby entry and exit of a gas through the through hole is prevented.

In order to improve airtightness of the disk drive apparatus, it is desirable that the number of through holes defined in the base portion should be small. In the disk drive apparatus described in JP-A 2012-74114, however, three through holes are required for the three common wires. Meanwhile, in the case where the three common wires are joined together to define a stranded wire and the stranded wire is passed through only one common through hole, minute gaps are inevitably defined between the wires in the stranded wire. It is difficult to fill each of these gaps with the sealant, and the airtightness of the disk drive apparatus is reduced. Moreover, in the case where the stranded wire is passed through the through hole, it is necessary to increase the diameter of the through hole. A disk drive apparatus in which a through hole having a large diameter is defined tends to be reduced in airtightness.

SUMMARY OF THE INVENTION

A spindle motor for use in a disk drive apparatus according to a preferred embodiment of the present invention includes a rotating portion, a stationary portion, and a bearing mechanism. The rotating portion includes a rotor magnet, and is arranged to rotate about a central axis extending in a vertical direction. The bearing mechanism is arranged to support the rotating portion such that the rotating portion is rotatable with respect to the stationary portion. The stationary portion includes a base portion and a stator. The base portion is in the shape of a plate, extending in directions perpendicular or substantially perpendicular to the vertical direction, and includes a plurality of base through holes passing therethrough in the vertical direction. The stator is arranged on an upper side of the base portion, and includes a stator core and a plurality of coils. The stator core includes a plurality of teeth each of whose tips is opposed to the rotor magnet. The plurality of coils are arranged on the plurality of teeth. The plurality of coils preferably include three coil groups. Each coil group includes one or more of the coils defined by a single conducting wire. On the upper side of the base portion, a joint portion where at least two of three common wires are joined together to define a single common wire is provided, so that the three common wires become one or two common wire elements, each common wire being one end portion of the conducting wire defining a separate one of the three coil groups. Each of the one or two common wire elements and three lead wire elements is passed through a separate one of the plurality of base through holes to reach a lower side of the base portion, each lead wire element being an opposite end portion of the conducting wire defining a separate one of the three coil groups. Each of the plurality of base through holes includes a circular sealing portion where a sealant is provided between an inner circumference of the base through hole and an entire circumferential extent of a surface of a corresponding one of the wire elements.

Another preferred embodiment of the present invention provides a method of manufacturing a stator. A method of manufacturing a stator according to a preferred embodiment of the present invention includes the steps of: a) defining a plurality of coils around a plurality of teeth of a stator core, the plurality of coils preferably including three coil groups; and b) defining a joint portion where three common wires are joined together to define a single common wire element, each common wire being one end portion of a conducting wire defining a separate one of the three coil groups. Step b) includes: b1) defining a folded portion by folding back one of the three common wires, the three common wires being drawn out in a same direction through one slot of the stator core; b2) defining a twisted wire portion by twisting the folded portion together with the other two common wires; b3) defining a solder layer arranged to coat at least a portion of the twisted wire portion; and b4) cutting a tip of the twisted wire portion while retaining a portion of the solder layer.

The spindle motor used in the disk drive apparatus according to preferred embodiments of the present invention achieves improved airtightness of the disk drive apparatus. The method of manufacturing the stator according to another preferred embodiment of the present invention enables the length of the joint portion to be adjusted easily.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
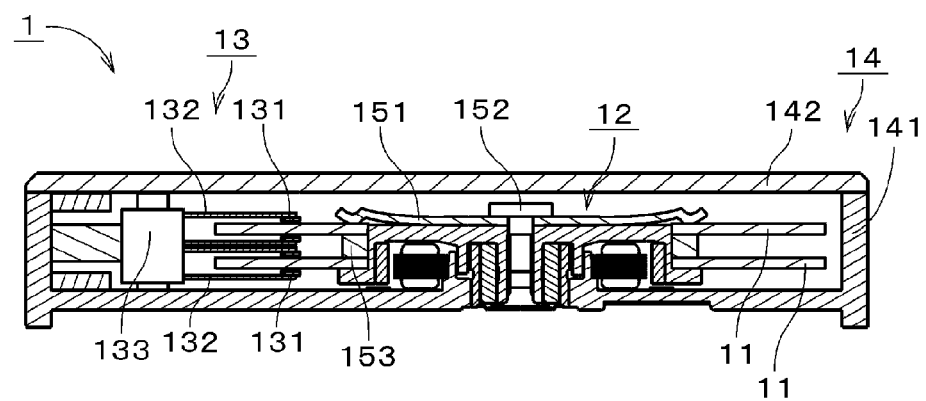
FIG. 1 is a vertical cross-sectional view of a disk drive apparatus according to a preferred embodiment of the present invention.

It is assumed herein that a vertical direction is defined as a direction in which a central axis of a motor extends, and that an upper side and a lower side along the central axis in FIG. 1 are referred to simply as an upper side and a lower side, respectively. It should be noted, however, that the above definitions of the vertical direction and the upper and lower sides should not be construed to restrict relative positions or directions of different members or portions when the motor is actually installed in a device. Also note that a direction parallel or substantially parallel to the central axis is referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

FIG. 1 is a vertical cross-sectional view of a disk drive apparatus 1 including a spindle motor (hereinafter referred to simply as a "motor") 12 according to a preferred embodiment of the present invention. The disk drive apparatus 1 is preferably, for example, a hard disk drive. The disk drive apparatus 1 preferably includes, for example, two disks 11, the motor 12, an access portion 13, a housing 14, and a clamper 151. The motor 12 is arranged to rotate the disks 11, on which information is recorded. The access portion 13 is arranged to perform at least one of reading and writing of information from or to the two disks 11.

The housing 14 preferably includes a first housing member 141 and a plate-shaped second housing member 142. The disks 11, the motor 12, the access portion 13, and the clamper 151 are accommodated in the first housing member 141. The second housing member 142 is fitted to the first housing member 141 to define the housing 14. An interior space of the disk drive apparatus 1 is preferably a clean space with no, or only an extremely small amount of, dirt or dust. The interior space of the disk drive apparatus 1 is filled with an air. Note that the interior space of the disk drive apparatus 1 may alternatively be filled with a helium gas, a hydrogen gas, or a mixture of either or both of these gases and an air.

The two disks 11 are preferably arranged above and below a spacer 153, and are clamped to the motor 12 by the clamper 151. The access portion 13 includes heads 131, arms 132, and a head actuator mechanism 133. Each of the heads 131 is arranged in close proximity to one of the disks 11 to magnetically perform at least one of the reading and the writing of information from or to the disk 11. Each of the arms 132 is arranged to support an associated one of the heads 131. The head actuator mechanism 133 is arranged to actuate each of the arms 132 to move an associated one of the heads 131 relative to an associated one of the disks 11. The above mechanism enables the head 131 to make access to a desired location on the rotating disk 11 with the head 131 being arranged in close proximity to the disk 11.

Figure 2:
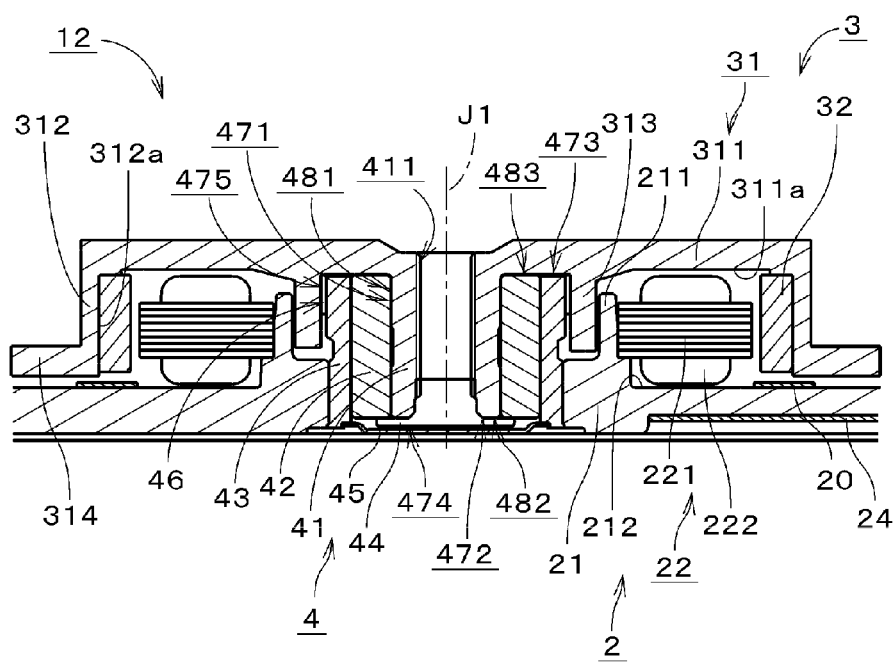
FIG. 2 is a vertical cross-sectional view of a motor according to a preferred embodiment of the present invention.

FIG. 2 is a vertical cross-sectional view of the motor 12. The motor 12 is preferably an outer-rotor motor, and includes a stationary portion 2, which is a stationary assembly, a rotating portion 3, which is a rotating assembly, and a bearing mechanism 4 arranged to support the rotating portion 3 such that the rotating portion 3 is rotatable with respect to the stationary portion 2. The stationary portion 2 preferably includes a base plate 21, which is a base portion, a stator 22, a magnetic member 20, and a circuit board 24. The base plate 21 is preferably in the shape of a plate, extending in a plane perpendicular or substantially perpendicular to the vertical direction, and is a portion of the first housing member 141 illustrated in FIG. 1. The base plate 21 is preferably defined by, for example, subjecting a metallic member molded by casting to a cutting process. The stator 22 is arranged above the base plate 21, and includes a stator core 221 and coils 222. A radially inner portion of the stator core 221 is fixed to a circumference of a cylindrical holder 211 of the base plate 21. The magnetic member 20 is preferably annular, being centered on a central axis J1 extending in the vertical direction, and is fixed to an upper surface 212 of the base plate 21 through, for example, an adhesive. The circuit board 24 is mounted on a lower surface of the base plate 21. As described below, in the stationary portion 2, conducting wires defining the coils 222 are preferably inserted into through holes of the base plate 21. End portions of the conducting wires are joined to the circuit board 24.

The rotating portion 3 preferably includes a rotor hub and a rotor magnet 32. The rotor hub 31 preferably has a covered cylinder shape or substantially a covered cylinder shape. The rotor hub 31 preferably includes a cover portion 311, a side wall portion 312, a hub tubular portion 313, and a disk mount portion 314. The cover portion 311 is arranged axially above the stator 22. The hub tubular portion 313 is cylindrical, being centered on the central axis J1, and is arranged to extend downward from a lower surface 311a of the cover portion 311 radially outside the bearing mechanism 4. The side wall portion 312 is arranged to extend downward from an outer edge of the cover portion 311. The disk mount portion 314 is preferably arranged to extend radially outward from the side wall portion 312. The disks 11 illustrated in FIG. 1 are mounted on the disk mount portion 314. The rotor magnet 32 is fixed to an inner circumferential surface 312a of the side wall portion 312, and is arranged radially outside the stator 22. The magnetic member 20 is located below the rotor magnet 32. A magnetic attraction force is produced between the rotor magnet 32 and the magnetic member 20. While the motor 12 is running, torque is produced between the stator 22 and the rotor magnet 32 due to magnetic flux currents interacting therebetween, such that the rotating portion 3 is caused to rotate about the central axis J1.

The bearing mechanism 4 preferably includes a shaft portion 41, a sleeve 42, a sleeve housing 43, a thrust plate 44, a cap portion 45, and a lubricating oil 46. The shaft portion 41 is arranged to extend downward from a radially inner portion of the cover portion 311. The shaft portion 41 and the rotor hub 31 are preferably defined by a single continuous monolithic member. A female screw portion 411 extending through the length of the shaft portion 41 is preferably defined in an interior of the shaft portion 41. At a center of the cover portion 311, a male screw 152 illustrated in FIG. 1 is screwed into the female screw portion 411. The clamper 151 is thus fixed to the motor 12 to clamp the disks 11 to the rotor hub 31.

The shaft portion 41 is inserted inside the sleeve 42. The sleeve housing 43 is arranged inside the hub tubular portion 313. The sleeve 42 is fixed to an inner circumferential surface of the sleeve housing 43. The thrust plate 44 is fixed to a lower portion of the shaft portion 41 as a result of screwing of a male screw portion at a center thereof into the female screw portion 411. The cap portion 45 is preferably fixed to a lower end of the sleeve housing 43 to close a lower opening of the sleeve housing 43.

In the motor 12, the lubricating oil 46 is continuously provided within a radial gap 471 defined between an inner circumferential surface of the sleeve 42 and an outer circumferential surface of the shaft portion 41, a first thrust gap 472 defined between a lower surface of the sleeve 42 and an upper surface of the thrust plate 44, and a second thrust gap 473 defined between the lower surface 311a of the cover portion 311 and a combination of an upper surface of the sleeve 42 and an upper surface of the sleeve housing 43. In addition, the lubricating oil 46 is also continuously provided within a gap 474 defined between a lower surface of the thrust plate 44 and an upper surface of the cap portion 45, and a seal gap 475 defined between an inner circumferential surface of the hub tubular portion 313 and an upper portion of an outer circumferential surface of the sleeve housing 43.

Radial dynamic pressure groove arrays are defined in an upper portion and a lower portion of the inner circumferential surface of the sleeve 42. In addition, thrust dynamic pressure groove arrays are defined in the upper surface and the lower surface of the sleeve 42. In the radial gap 471, a radial dynamic pressure bearing portion 481 is preferably defined by the radial dynamic pressure groove arrays. A first thrust dynamic pressure bearing portion 482 and a second thrust dynamic pressure bearing portion 483, respectively, are defined by the thrust dynamic pressure groove arrays in the first and second thrust gaps 472 and 473. While the motor 12 is running, the shaft portion 41 and the thrust plate 44 are preferably supported, without being in contact with any of the sleeve 42, the sleeve housing 43, and the cap portion 45, by the radial dynamic pressure bearing portion 481 and the first and second thrust dynamic pressure bearing portions 482 and 483, that is, by the bearing mechanism 4. The rotor hub 31 and the rotor magnet 32 are thus supported such that the rotor hub 31 and the rotor magnet 32 are rotatable with respect to the base plate 21 and the stator 22.

Figure 3:
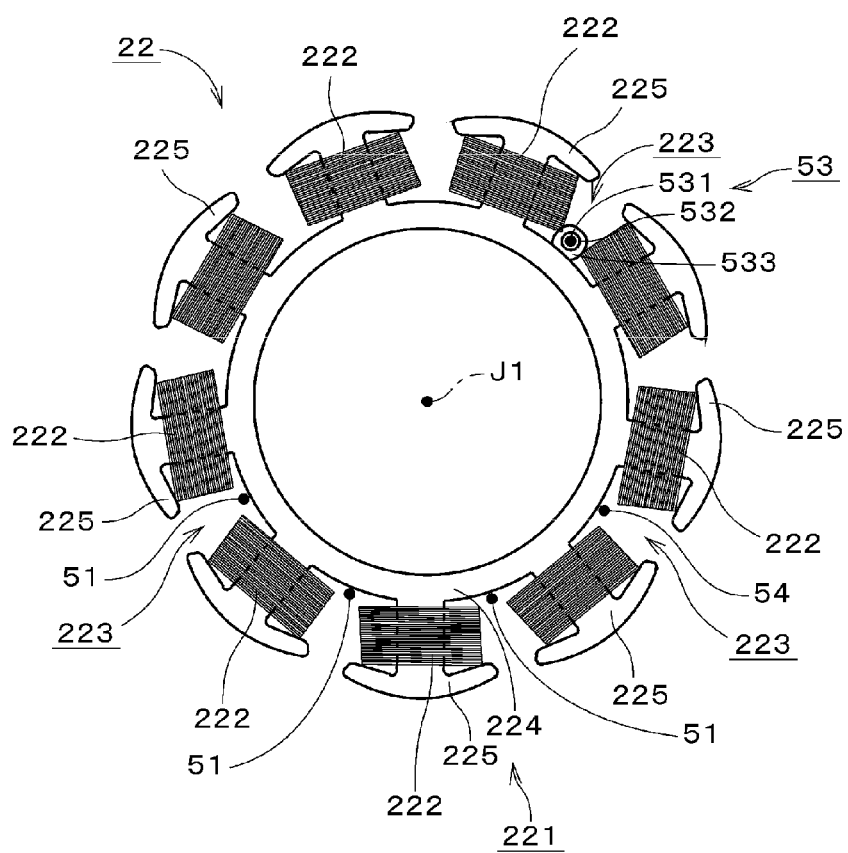
FIG. 3 is a bottom view of a stator according to a preferred embodiment of the present invention.

FIG. 3 is a bottom view of the stator 22, illustrating the stator 22 as viewed from a direction of the base plate 21. The stator 22 includes the stator core 221 and the coils 222. The stator core 221 includes a cylindrical or substantially cylindrical core back 224 centered on the central axis J1, and a plurality of teeth 225 each of whose tips is opposed to the rotor magnet 32. The number of teeth 225 is preferably, for example, nine. Each of the teeth 225 is preferably in or substantially in the shape of the letter "T", and is arranged to extend radially outward from an outer circumference of the core back 224 and, at an outer end portion thereof, extend in both circumferential directions. Each coil 222 is preferably defined by a conducting wire, i.e., a metal wire whose surface is coated with an insulating layer, wound around a separate one of the teeth 225. That is, the coils 222 are arranged on the teeth 225.

The coils 222 are defined by three coil groups. The three coil groups are respectively used for U, V, and W phases. In an example of FIG. 3, each coil group is preferably defined by three coils 222 each corresponding to a single conducting wire. However, if so desired, each coil group may alternatively be defined by one coil. That is, each coil group includes one or more coils defined by a single conducting wire. Hereinafter, one end portion of the conducting wire of each coil group will be referred to as a "common wire", while the other end portion thereof will be referred to as a "lead wire". Of each conducting wire, a portion between the common wire and the lead wire defines the three coils 222. In FIG. 3, each of the three lead wires is denoted by reference numeral "51".

Figure 4:
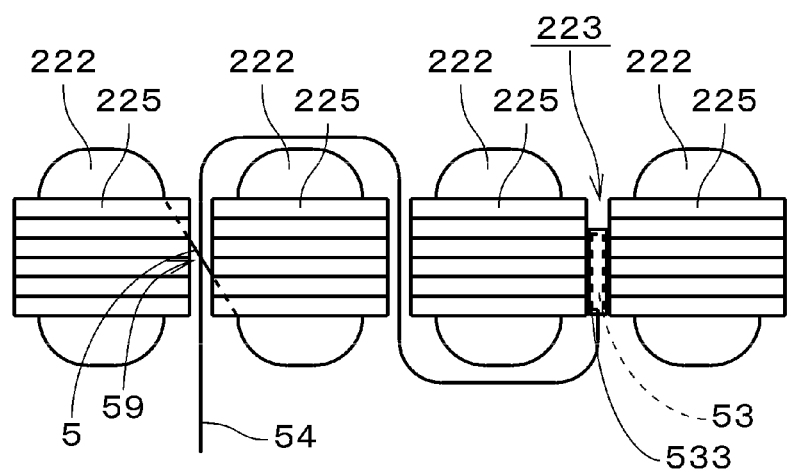
FIG. 4 is a diagram illustrating coils and teeth according to a preferred embodiment of the present invention as arranged in a lateral direction.

FIG. 4 is a diagram illustrating four of the coils 222 and the corresponding teeth 225 adjacent to one another in the circumferential direction as arranged in a lateral direction. In the stator 22, a joint portion 53, where the three common wires of the three coil groups are joined together to define a single common wire 54, is provided. Referring to FIG. 3, the joint portion 53 preferably includes a twisted wire portion 531 defined by end portions of the three common wires and the single common wire 54 twisted together. The twisted wire portion 531 is entirely or substantially entirely coated with a solder layer 532. The joint portion 53 is preferably fixed to the core back 224 of the stator core 221 through an adhesive 533 at one slot 223 of the stator core 221, i.e., at a space between one of the teeth 225 and an adjacent one of the teeth 225.

Assuming that a portion of any conducting wire whose surface is continuous through an entire circumferential extent thereof and which is not twisted together with another wire is defined as a "wire element", the single common wire 54 is a wire element. In addition, each of the three lead wires 51 of the stator 22 illustrated in FIG. 3 is also a wire element. Hereinafter, the common wire 54 will be referred to as a "common wire element" 54, while each lead wire 51 will be referred to as a "lead wire element" 51. The single common wire element 54 and the three lead wire elements 51 are preferably arranged separately in a plurality of slots 223 which are located adjacent to one another in the circumferential direction.

Figure 5:
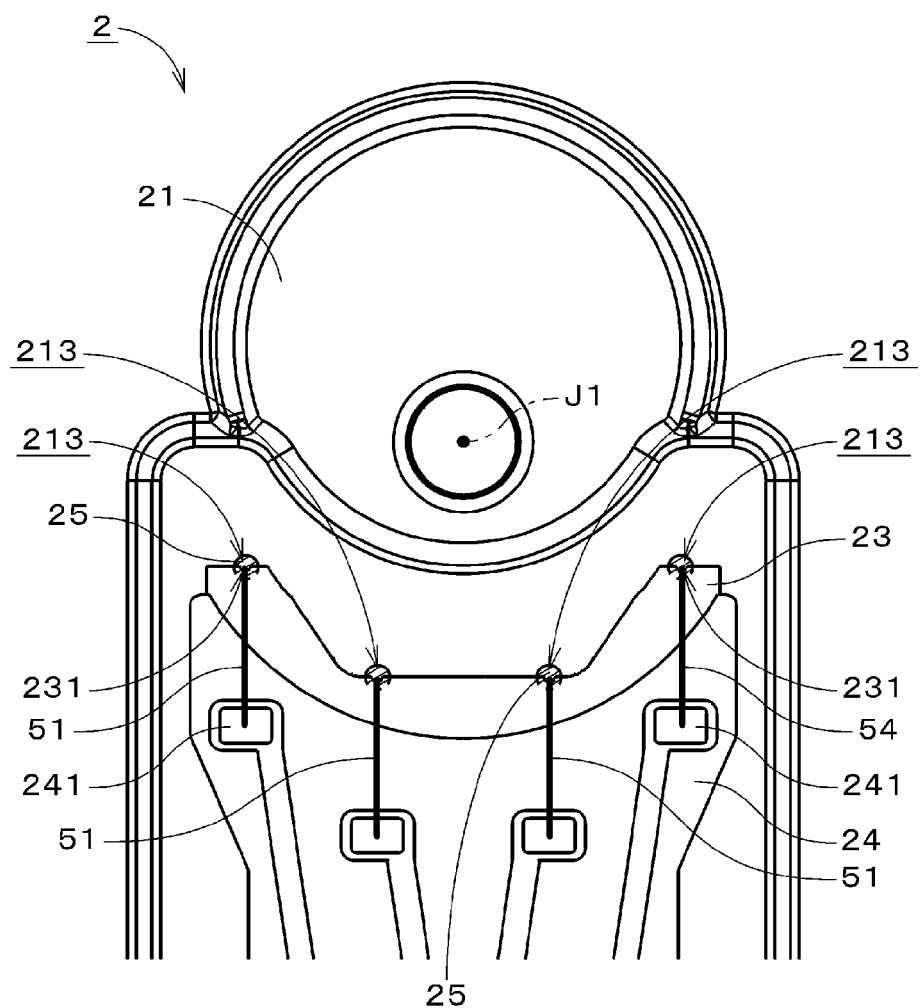
FIG. 5 is a bottom view of a stationary portion according to a preferred embodiment of the present invention.

FIG. 5 is a bottom view of the stationary portion 2, illustrating primarily the lower surface of the base plate 21. The base plate 21 preferably includes a plurality of base through holes 213 passing therethrough in the vertical direction. A plate-shaped lead wire guide member 23 made of an insulating material and the circuit board 24, which is a flexible circuit board, are preferably fixed to the lower surface of the base plate 21. A plurality of electrodes 241 are arranged on the circuit board 24.

The single common wire element 54 and the three lead wire elements 51 are arranged to extend from the plurality of slots 223 illustrated in FIG. 3 toward the plurality of base through holes 213 on an upper side of the base plate 21, and then reach a lower side of the base plate 21 after passing through the plurality of base through holes 213. The lead wire guide member 23 preferably includes a plurality of cut portions 231 each of which is arranged to be in contact with a separate one of the single common wire element 54 and the three lead wire elements 51 directly under a corresponding one of the plurality of base through holes 213. On the lower side of the base plate 21, an end portion of each of the single common wire element 54 and the three lead wire elements 51 is connected to a separate one of the electrodes 241. A circular sealing portion 25 where a sealant is located is arranged between an inner circumference of each base through hole 213 and an entire circumferential extent of a surface of a corresponding one of the wire elements 54 and which passes through the base through hole 213. The base through hole 213 is closed by the circular sealing portion 25. The sealant is preferably, for example, an adhesive. In FIG. 5, each circular sealing portion 25 is indicated by parallel oblique lines.

Referring to FIG. 4, the conducting wire 5 of one of the coil groups preferably includes a holding portion 59 arranged to cross a portion of the common wire element 54 between the joint portion 53 and a corresponding one of the base through holes 213 while passing on a side away from the stator core 221. In other words, the holding portion 59 is a portion of the conducting wire 5 arranged to hold the common wire element 54 on the stator core 221 by holding the aforementioned portion of the common wire element 54 between itself and the stator core 221.

Figure 6:
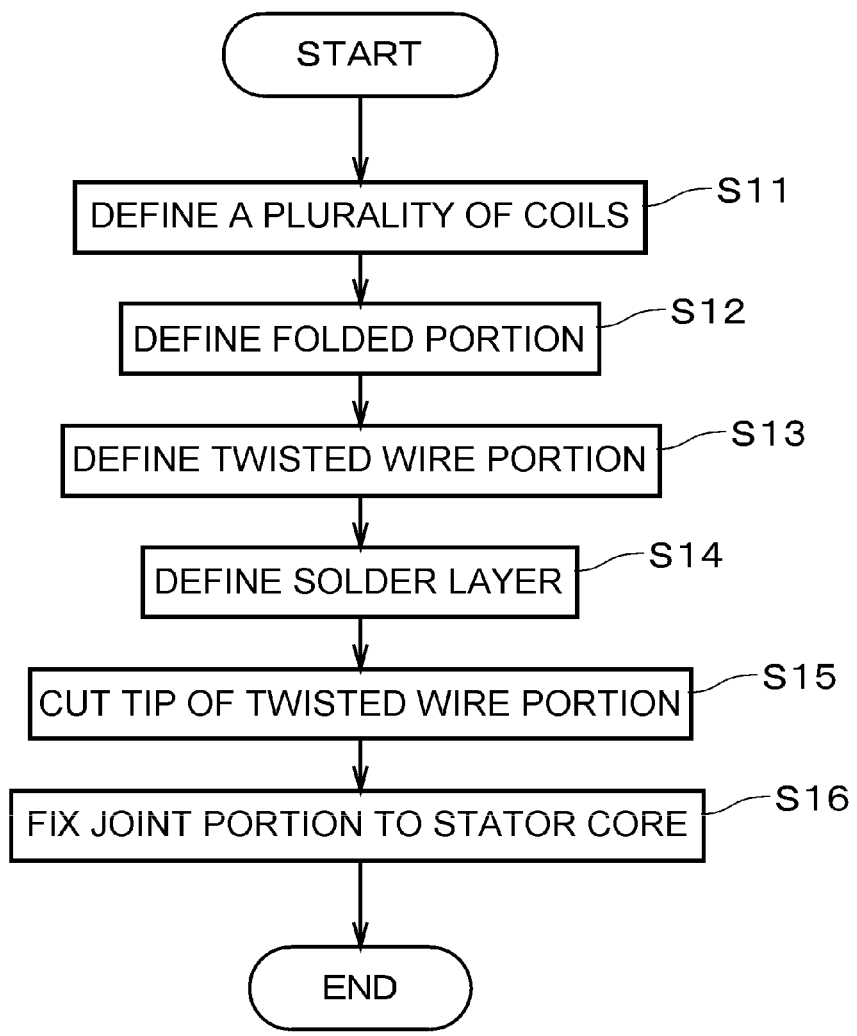
FIG. 6 is a flowchart illustrating a process of manufacturing the stator according to a preferred embodiment of the present invention.

FIG. 6 is a flowchart illustrating a flow of a process of manufacturing the stator 22. In the process of manufacturing the stator 22, the stator core 221 including the teeth 225 is prepared beforehand. Then, the coils 222 including the three coil groups, i.e., first, second, and third coil groups, are defined around the teeth 225 (step S11).

Figure 7:
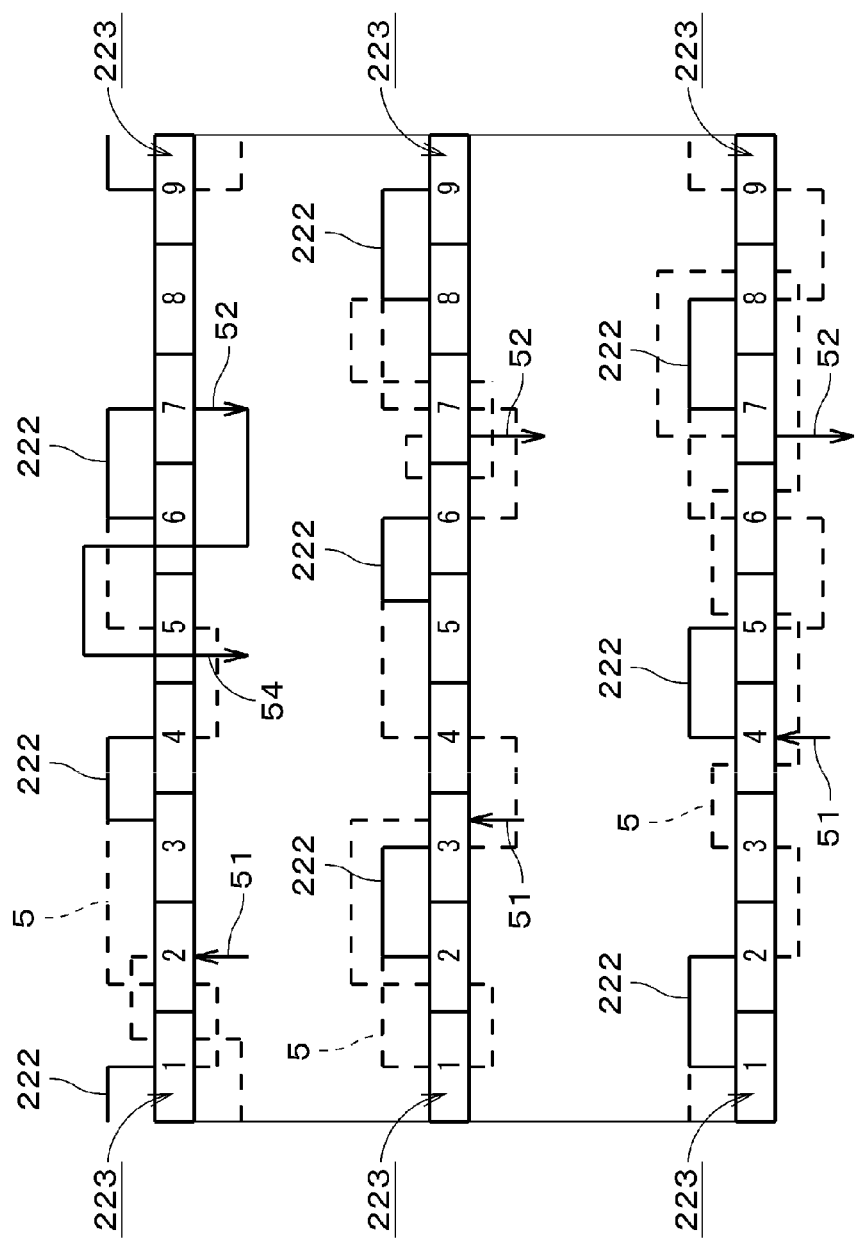
FIG. 7 is a diagram illustrating how a plurality of coils are defined according to a preferred embodiment of the present invention.

FIG. 7 is a diagram explaining how the coils 222 are defined. An upper portion, a middle portion, and a lower portion of FIG. 7 illustrate routes of the conducting wires 5 which define the first, second, and third coil groups, respectively. In each of the upper, middle, and lower portions of FIG. 7, the nine slots 223 of the stator core 221 are represented by blocks denoted by numbers "1" to "9". When the coils 222 are defined, the first, second, and third coil groups are defined in the order named.

In the defining of the first coil group illustrated in the upper portion of FIG. 7, the lead wire element 51, i.e., one end portion of the conducting wire 5, is arranged at the second slot. In each of the upper, middle, and lower portions of FIG. 7, the lead wire element 51 is represented by an arrow indicated by reference numeral "51". The conducting wire 5 is wound around the tooth 225 between the ninth and first slots 223 to define one of the coils 222. In the example illustrated in FIG. 7, the conducting wire 5 is always wound in a clockwise direction. The same is true of each of the other coil groups. Note that the conducting wire 5 may be wound in a counterclockwise direction.

Next, the conducting wire 5 is wound around the tooth 225 between the third and fourth slots 223 to define another one of the coils 222. Thereafter, the conducting wire 5 is wound around the tooth 225 between the sixth and seventh slots 223 to define yet another one of the coils 222. As described above, the coils 222 are defined around the tooth 225 between the ninth and first slots 223, the tooth 225 between the third and fourth slots 223, and the tooth 225 between the sixth and seventh slots 223 in the order named.

Portions of the conducting wire 5 between the coils 222 function as passage lines. In each of the upper, middle, and lower portions of FIG. 7, the portions of the conducting wire 5 which function as the passage lines are represented by broken lines. The common wire 52, which is the other end portion of the conducting wire 5, is drawn out downwardly through the seventh slot 223. In each of the upper, middle, and lower portions of FIG. 7, the common wire 52 is represented by an arrow indicated by reference numeral "52". An end portion of the common wire 52 is drawn out downwardly through the fifth slot 223 after passing through the sixth slot 223. The end portion of the common wire 52 is the common wire element 54, and is therefore represented by an arrow indicated by reference numeral "54".

In the defining of the second coil group illustrated in the middle portion of FIG. 7, the lead wire element 51, i.e., one end portion of the conducting wire 5, is arranged at the third slot. The coils 222 are defined by the conducting wire 5 around the tooth 225 between the second and third slots 223, the tooth 225 between the fifth and sixth slots 223, and the tooth 225 between the eighth and ninth slots 223 in the order named. The common wire 52, which is the other end portion of the conducting wire 5, is drawn out downwardly through the seventh slot 223.

In the defining of the third coil group illustrated in the lower portion of FIG. 7, the lead wire element 51, i.e., one end portion of the conducting wire 5, is arranged at the fourth slot 223. The conducting wire 5 is wound around the tooth 225 between the fourth and fifth slots 223 to define one of the coils 222. After this coil 222 is defined, the conducting wire 5 is drawn out downwardly through the fifth slot 223, and passes to the sixth slot 223. Accordingly, the common wire element 54 illustrated in the upper portion of FIG. 7 is held on the core back 224 of the stator core 221 by the conducting wire 5 of the third coil group at the fifth slot 223. That is, the holding portion 59, where the conducting wire 5 of the third coil group crosses the end portion of the common wire, i.e., the common wire element 54, while passing on the side away from the stator core 221, is defined (see FIG. 4). Thereafter, the conducting wire 5 is wound around the tooth 225 between the seventh and eighth slots 223 and the tooth 225 between the first and second slots 223 in the order named. The common wire 52, which is the other end portion of the conducting wire 5 of the third coil group, is drawn out downwardly through the seventh slot 223.

Figure 8:
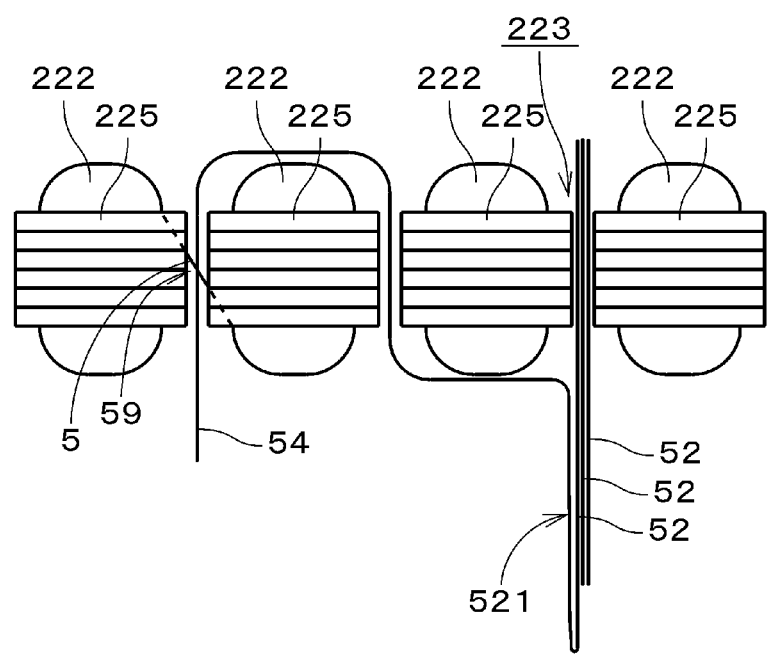
FIG. 8 is a diagram illustrating how a joint portion is defined according to a preferred embodiment of the present invention.
Figure 9:
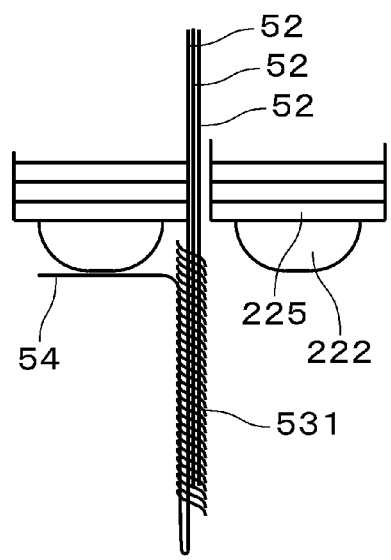
FIG. 9 is a diagram illustrating how the joint portion is defined according to a preferred embodiment of the present invention.
Figure 10:
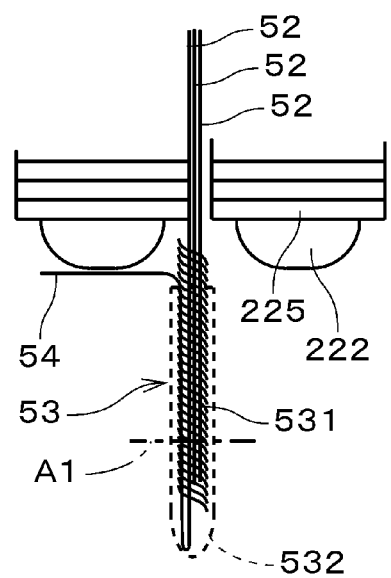
FIG. 10 is a diagram illustrating how the joint portion is defined according to a preferred embodiment of the present invention.

After the coils 222 are defined, of the three common wires 52 drawn out in the same direction through the seventh slot 223 of the stator core 221, the common wire 52 of the first coil group is folded back to define a folded portion 521 illustrated in FIG. 8 (step S12). The folded portion 521 is twisted together with the other two common wires 52 to define the twisted wire portion 531 as illustrated in FIG. 9 (step S13). Soldering is performed on the twisted wire portion 531 to define the solder layer 532, which coats the twisted wire portion 531 entirely or in part as illustrated in FIG. 10 (step S14). In FIG. 10, the solder layer 532 is represented by a broken line. At least a portion of the twisted wire portion 531 is coated with the solder layer 532. At this time, the insulating layer of each common wire 52 is removed by a solder having a high temperature. As a result, the metal wires of the three common wires 52 are electrically connected to one another through the solder. That is, the three common wires 52 are joined together. Then, a tip of the twisted wire portion 531 is preferably cut while retaining a portion of the solder layer 532 (step S15). In FIG. 10, a cut position of the twisted wire portion 531 is indicated by a dot-dashed line denoted by reference symbol "A1". A remaining portion of the twisted wire portion 531 and a remaining portion of the solder layer 532 together define the joint portion 53.

Figure 11:
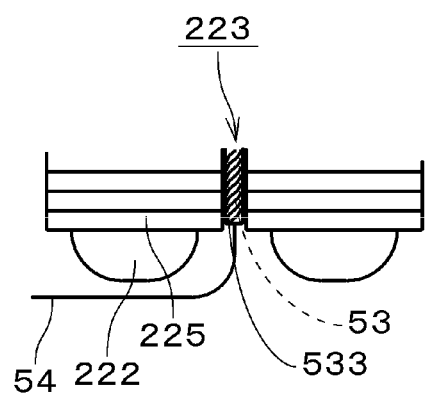
FIG. 11 is a diagram illustrating how the joint portion is defined according to a preferred embodiment of the present invention.

At the joint portion 53 defined by the above-described process, the three common wires 52 are joined to one another, and the three common wires 52 are drawn out as the single common wire element 54. At the twisted wire portion 531 of the joint portion 53, the end portions of the three common wires 52 and the single common wire element 54 are twisted together with ends of the three common wires 52 and the single common wire element 54 aligned. In addition, at least a portion of the twisted wire portion 531 is coated with the solder layer 532. The three common wires 52 are bent in the vicinity of the joint portion 53, and as illustrated in FIG. 11, the joint portion 53 is arranged in the seventh slot 223. The joint portion 53 is preferably fixed to the stator core 221 through the adhesive 533 (step S16). As a result, a situation in which the joint portion 53 is arranged in the slot 223 is more securely maintained. The stator 22 is completed by the above-described process.

In manufacturing the stationary portion 2, the single common wire element 54 and the three lead wire elements 51 of the stator 22 are preferably passed through the respective base through holes 213 from the upper side of the base plate 21 to reach the lower side of the base plate 21. On the lower side of the base plate 21, the single common wire element 54 and the three lead wire elements 51 are connected to the respective electrodes 241. Each base through hole 213 is filled with the sealant, so that the circular sealing portion 25 is defined in the base through hole 213.

As described above, at the joint portion 53 on the upper side of the base plate 21, the three common wires 52, each of which is one end portion of a separate one of the conducting wires 5 of the three coil groups, are joined together, so that the three common wires 52 together define the single common wire element 54. Each of the single common wire element 54 and the three lead wire elements 51, each of which is the other end portion of a separate one of the conducting wires 5 of the three coil groups, is passed through a separate one of the base through holes 213 to reach the lower side of the base plate 21, and is connected to the corresponding electrode 241 on the circuit board 24. Then, the sealant is arranged between the inner circumference of each base through hole 213 and the entire circumferential extent of the surface of the corresponding wire element. As described above, only one wire element is passed through each base through hole 213, and this enables the sealant to be arranged between the inner circumference of the base through hole 213 and the corresponding wire element without a gap being defined at any point along the circumference thereof, and also enables the diameter of each base through hole 213 to be reduced. As a result, an improvement in airtightness of the disk drive apparatus 1 is achieved.

In the stationary portion 2, the single common wire element 54 and the three lead wire elements 51 are preferably separately arranged in a plurality of slots 223 which are preferably adjacent to one another in the circumferential direction. This makes it easy to insert a plurality of wire elements into a plurality of base through holes 213 when the stationary portion 2 is manufactured. In addition, it is possible to arrange the plurality of base through holes 213 in close proximity to one another, making it possible to reduce the size of the lead wire guide member 23. Moreover, it is possible to arrange the plurality of electrodes 241 in close proximity to one another on the circuit board 24, making it possible to reduce the size of the circuit board 24.

The tip of the twisted wire portion 531 is preferably cut when the joint portion 53 is defined. This makes it easy to adjust the length of the joint portion 53, making it easy to arrange the joint portion 53 in one of the slots 223 of the stator core 221. In addition, before the joint portion 53 is defined, the end portion of the common wire 52 defining the common wire element 54 is preferably held on the stator core 221 by another one of the conducting wires 5. This improves workability in defining the joint portion 53, making it easy to define the joint portion 53.

Note that the above-described disk drive apparatus 1 may be modified in a variety of manners. On the upper side of the base plate 21, a joint portion 53 where two of the three common wires 52 are joined together to define a single common wire may be provided. That is, at the joint portion 53, at least two of the three common wires 52 are joined together, so that the three common wires 52 become one or two common wire elements 54. The one or two common wire elements 54 and the three lead wire elements 51 are preferably arranged separately in a plurality of slots 223 which are adjacent to one another in the circumferential direction.

It is preferable that the three common wires 52 should be joined together to define the single common wire element 54 at the joint portion 53 from the viewpoint of decreasing the number of base through holes 213. This results in an additional improvement in the airtightness of the disk drive apparatus 1.

The joint portion 53 may be defined by a method different from the process illustrated in FIG. 6 depending on design of the stator 22.

Features of the above-described preferred embodiments and the modifications thereof may be combined appropriately as long as no conflict arises.

Preferred embodiments of the present invention are applicable, for example, to spindle motors for use in disk drive apparatuses. Methods of manufacturing stators according to preferred embodiments of the present invention may be used to manufacture stators for use in a variety of types of motors.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor of a disk drive apparatus, the spindle motor comprising:
    a rotating portion including a rotor magnet, and configured to rotate about a central axis extending in a vertical direction;
    a stationary portion; and
    a bearing mechanism supporting the rotating portion such that the rotating portion is rotatable with respect to the stationary portion; wherein
    the stationary portion includes:
        a base portion in a shape of a plate, extending in a direction perpendicular or substantially perpendicular to the vertical direction, and including a plurality of base through holes passing therethrough in the vertical direction; and
        a stator located on an upper side of the base portion;
    the stator includes:
        a stator core including a plurality of teeth each including tips opposed to the rotor magnet; and
        a plurality of coils arranged on the teeth;
    the plurality of coils include three coil groups;
    each coil group includes one or more of the plurality of coils which are each defined by a single conducting wire;
    on the upper side of the base portion, a joint portion where at least two of three common wires are joined together to define a single common wire is provided, so that the three common wires become one or two common wire elements, each common wire being one end portion of the conducting wire defining a separate one of the three coil groups;
    each of the one or two common wire elements and three lead wire elements is passed through a separate one of the plurality of base through holes to reach a lower side of the base portion, each lead wire element being an opposite end portion of the conducting wire defining a separate one of the three coil groups; and
    each of the plurality of base through holes includes a sealing portion where a sealant is positioned between an inner circumference of the base through hole and an entire circumferential extent of a surface of a corresponding one of the wire elements.

2. The spindle motor of the disk drive apparatus according to claim 1, wherein the three common wires are joined together to define the single common wire element at the joint portion.

3. The spindle motor of the disk drive apparatus according to claim 2, wherein the joint portion includes:
- a twisted wire portion defined by end portions of the three common wires and the single common wire element twisted together with ends of the three common wires and the single common wire element aligned; and
- a solder layer arranged to coat at least a portion of the twisted wire portion.

4. The spindle motor of the disk drive apparatus according to claim 3, wherein the conducting wire of one of the coil groups includes a holding portion arranged to cross a portion of the single common wire element between the joint portion and a corresponding one of the plurality of base through holes while passing on a side away from the stator core.

5. The spindle motor of the disk drive apparatus according to claim 1, wherein the joint portion is fixed to the stator core at one slot of the stator core through an adhesive.

6. The spindle motor of the disk drive apparatus according to claim 1, wherein the one or two common wire elements and the three lead wire elements are arranged to extend toward the plurality of base through holes through a plurality of slots adjacent to one another in a circumferential direction.

7. The spindle motor of the disk drive apparatus according to claim 1, wherein the sealant is an adhesive.

8. The spindle motor of the disk drive apparatus according to claim 2, wherein the base through holes are four in number.

9. The spindle motor of the disk drive apparatus according to claim 3, wherein the joint portion is arranged in one slot of the stator core.

10. The spindle motor of the disk drive apparatus according to claim 3, wherein an end portion of the solder layer is located inwardly of an axial end portion of the stator core.

11. A disk drive apparatus comprising:
- the spindle motor of the disk drive apparatus according to claim 1, the spindle motor being configured to rotate a disk;
- an access portion configured to perform at least one of reading and writing of information from or to the disk; and
- a housing configured to contain the disk, the spindle motor, and the access portion.

12. A method of manufacturing a stator, the method comprising the steps of:
- a) defining a plurality of coils around a plurality of teeth of a stator core, the coils including three coil groups; and
- b) defining a joint portion where three common wires are joined together to define a single common wire element, each common wire being one end portion of a conducting wire defining a separate one of the three coil groups;

wherein step b) includes:
- b1) defining a folded portion by folding back one of the three common wires, the three common wires being drawn out in a same direction through one slot of the stator core;
- b2) defining a twisted wire portion by twisting the folded portion together with the other two common wires;
- b3) defining a solder layer arranged to coat at least a portion of the twisted wire portion; and
- b4) cutting a tip of the twisted wire portion while retaining a portion of the solder layer.

13. The method of manufacturing the stator according to claim 12, wherein step a) includes defining a holding portion where the conducting wire of one of the coil groups is arranged to cross an end portion of the single common wire element while passing on a side away from the stator core.

14. The method of manufacturing the stator according to claim 12, wherein step b) further includes performing after step b4) step b5) including bending the twisted wire portion to locate the joint portion in the one slot of the stator core.

15. The method of manufacturing the stator according to claim 14, wherein step b) further includes performing after step b5) step b6) including fixing the joint portion to the stator core at the one slot of the stator core using an adhesive.

* * * * *